United States Patent
Bugnon et al.

(10) Patent No.: US 6,240,284 B1
(45) Date of Patent: May 29, 2001

(54) SYSTEM AND METHOD OF HANDLING EMERGENCY CALLS FROM ROAMING MOBILE STATIONS IN A RADIO TELECOMMUNICATIONS NETWORK

(75) Inventors: Jacques Bugnon, Repentigny; Binh Nguyen, Ville St-Laurent, both of (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/188,070

(22) Filed: Nov. 6, 1998

(51) Int. Cl.[7] .................................................. H04M 11/00
(52) U.S. Cl. ...................... 455/404; 455/433; 455/432; 455/436; 455/414
(58) Field of Search .................................. 455/404, 414, 455/433, 432, 436, 435, 438, 439; 379/45

(56) References Cited

U.S. PATENT DOCUMENTS

| | | | |
|---|---|---|---|
| 5,239,571 | * 8/1993 | Takahashi | 379/58 |
| 5,544,224 | * 8/1996 | Jonsson et al. | 379/58 |
| 5,596,625 | 1/1997 | LeBlanc | 379/60 |
| 5,598,460 | 1/1997 | Tendler | 379/59 |
| 5,689,548 | 11/1997 | Maupin et al. | 379/59 |
| 5,712,900 | * 1/1998 | Maupin et al. | 379/59 |
| 5,797,093 | * 8/1998 | Houde | 455/404 |
| 6,032,040 | * 2/2000 | Choy et al. | 455/414 |

FOREIGN PATENT DOCUMENTS

| | | |
|---|---|---|
| WO 97/21314 | 6/1997 | (WO). |
| WO 97/28659 | 8/1997 | (WO). |
| WO 97/44971 | 11/1997 | (WO). |

* cited by examiner

Primary Examiner—Daniel Hunter
Assistant Examiner—Lana Le
(74) Attorney, Agent, or Firm—Smith, Danamraj & Youst, P.C.

(57) ABSTRACT

A system and method in a radio telecommunications network for reconnecting an emergency call between a roaming mobile station with an emergency (emergency MS) and a public safety answering point (PSAP) when the call has been disconnected before the call was finished. The network includes a serving mobile switching center (MSC) serving the emergency MS, a border MSC bordering the serving MSC, and a home location register (HLR) that stores features and subscription data for the emergency MS. When the emergency call begins, a hotlining feature for the emergency MS is activated in the HLR which automatically reconnects the emergency MS to the PSAP when the MS accesses the network through a registration or by originating a subsequent call. Inter-exchange messages ensure that the emergency MS is automatically connected to the PSAP, even if the emergency MS accesses the network in the border MSC.

15 Claims, 4 Drawing Sheets

SYSTEM AND METHOD OF HANDLING EMERGENCY CALLS FROM ROAMING MOBILE STATIONS IN A RADIO TELECOMMUNICATIONS NETWORK

BACKGROUND OF THE INVENTION

1. Technical Field of the Invention

This invention relates to telecommunication systems and, more particularly, to a system and method of handling emergency calls from roaming mobile stations in a radio telecommunications network.

2. Description of Related Art

When a mobile subscriber initiates an emergency call such as a 911 call, the call is connected through a serving mobile switching center (MSC) to an end office (EO) known as a Public Safety Answering Point (PSAP). There may be situations in which the call is then prematurely disconnected. This disconnection may be due to the subscriber hanging up, loss of radio signal, border rescan problems, loss of the subscriber's mobile station (MS) during an attack, or other reasons. Current and previous versions of TR45.2 (PN 3581) state that under these circumstances, the serving MSC attempts to reestablish the call. In other words, the serving MSC pages for the MS, and if a page response is received, an alert signal is sent to the responding MS. If the alert signal is answered, the call is reconnected to the PSAP.

However, in existing networks, it is currently not possible to reconnect the emergency MS under certain circumstances. For example, the emergency MS may immediately originate another call to a different destination before the emergency call can be reconnected to the PSAP. Also, the MS may have been operating near the border of the serving MSC when the emergency call was dropped, and by the time the serving MSC attempts to reestablish the call the MS may have travelled into a bordering MSC. In this case, the emergency call cannot be reestablished.

There are no known prior art teachings of a solution to the aforementioned deficiency and shortcoming. In order to overcome the disadvantage of existing solutions, it would be advantageous to have a system and method of handling emergency calls in a radio telecommunications network in which an emergency MS is reconnected to the PSAP following a premature disconnection. The invention would reconnect the call to the PSAP even if the emergency MS attempts to originate a different call, or if the emergency MS has travelled into the service area of a bordering MSC.

SUMMARY OF THE INVENTION

In one aspect, the present invention is a method in a radio telecommunications network of reconnecting an emergency call between a mobile station with an emergency (emergency MS) and a public safety answering point (PSAP) when the call has been disconnected before the call was finished. The network includes a serving mobile switching center (MSC) serving the emergency MS, and a home location register (HLR) that stores features and subscription data for the emergency MS. The method comprises the steps of activating a hotlining feature in the HLR when the emergency call is begun, determining that the emergency call was disconnected before the call was finished, determining that the emergency MS attempts to access the network after the emergency call was disconnected, and automatically connecting the emergency MS to the PSAP.

The network may include a plurality of MSCs, and the emergency MS may register in a second MSC other than the serving MSC after the hotlining feature has been activated. The method then includes the steps of notifying the HLR that the emergency MS has registered in the second MSC, determining in the HLR that the emergency MS has an unfinished emergency call, and instructing the second MSC to connect the emergency MS to the PSAP.

If the emergency MS registers within the service area of a second MSC other than the serving MSC before the hotlining feature has been activated, the method includes the steps of sending a registration notification (REGNOT) message from the second MSC to the HLR, sending a registration cancellation (REGCANC) message from the HLR to the previous serving MSC identifying the emergency MS, and sending a return REGCANC message from the previous serving MSC to the HLR identifying that the emergency MS has an unfinished emergency call and providing a PSAP number to the HLR. This is followed by sending a qualification directive (QUALDIR) message from the HLR to the second MSC with the PSAP number and instructions to connect the emergency MS to the PSAP. Thereafter, when a registration or a call origination is received from the emergency MS in the second MSC, the call is automatically connected to the appropriate PSAP.

In another aspect, the present invention is a system in a radio telecommunications network for reconnecting an emergency call between an emergency MS and a PSAP when the call has been disconnected before the call was finished. The system comprises means within the HLR for activating a hotlining feature for the emergency MS when the emergency call is begun, means within the serving MSC for determining that the emergency call was disconnected before the call was finished, means within the serving MSC for determining that the emergency MS attempts to access the network after the emergency call was disconnected, and means within the serving MSC for automatically connecting the emergency MS to the PSAP.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
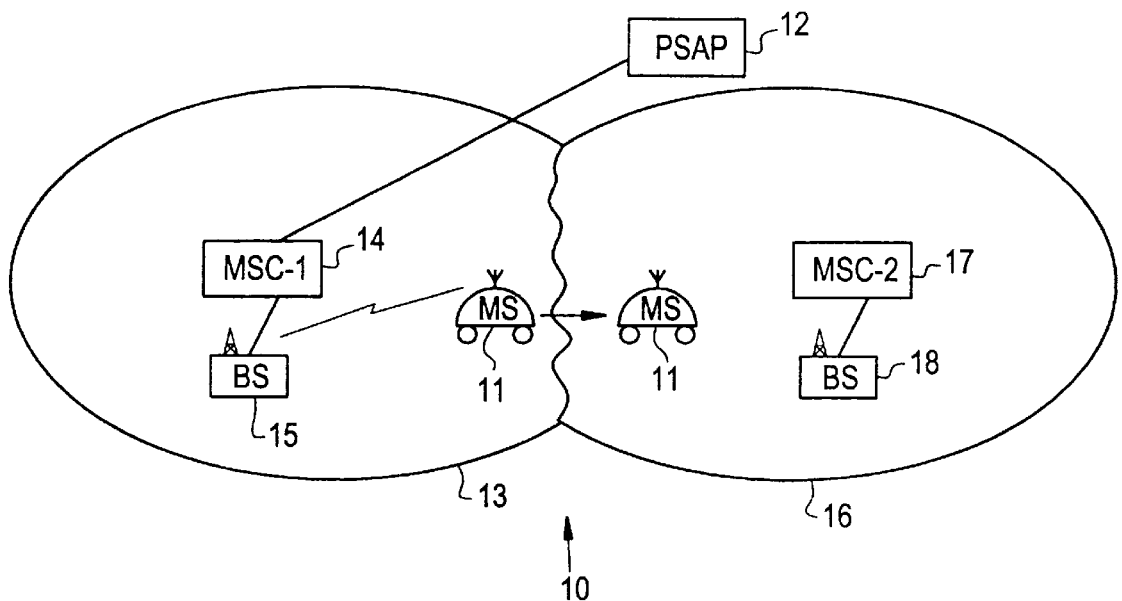
FIG. 1 (Prior Art) is a simplified block diagram of an existing radio telecommunications network in which an emergency call is prevented from being reestablished with an emergency MS due to the MS moving out of the service area of the serving mobile switching center (MSC) that first established the emergency call.

FIG. 1 is a simplified block diagram of an existing radio telecommunications network 10 in which an emergency call is prevented from being reestablished between an emergency MS 11 and a Public Safety Answering Point (PSAP) 12 due to the MS moving out of the service area 13 of the serving mobile switching center MSC) 14 that first established the emergency call, and out of range of base station 15 . If the call is prematurely disconnected while the MS is in the service area 13, and then the MS 11 travels into the service area 16 of a bordering MSC 17, then the emergency call cannot be reestablished by the serving MSC 14. The emergency MS must dial 911 again to gain access to the network through the BS 18 and the bordering MSC 17. In this case, the call will probably be connected to a different PSAP or PSAP operator who is not familiar with the emergency, and any information that was passed before the call was disconnected must be repeated.

Figure 2:
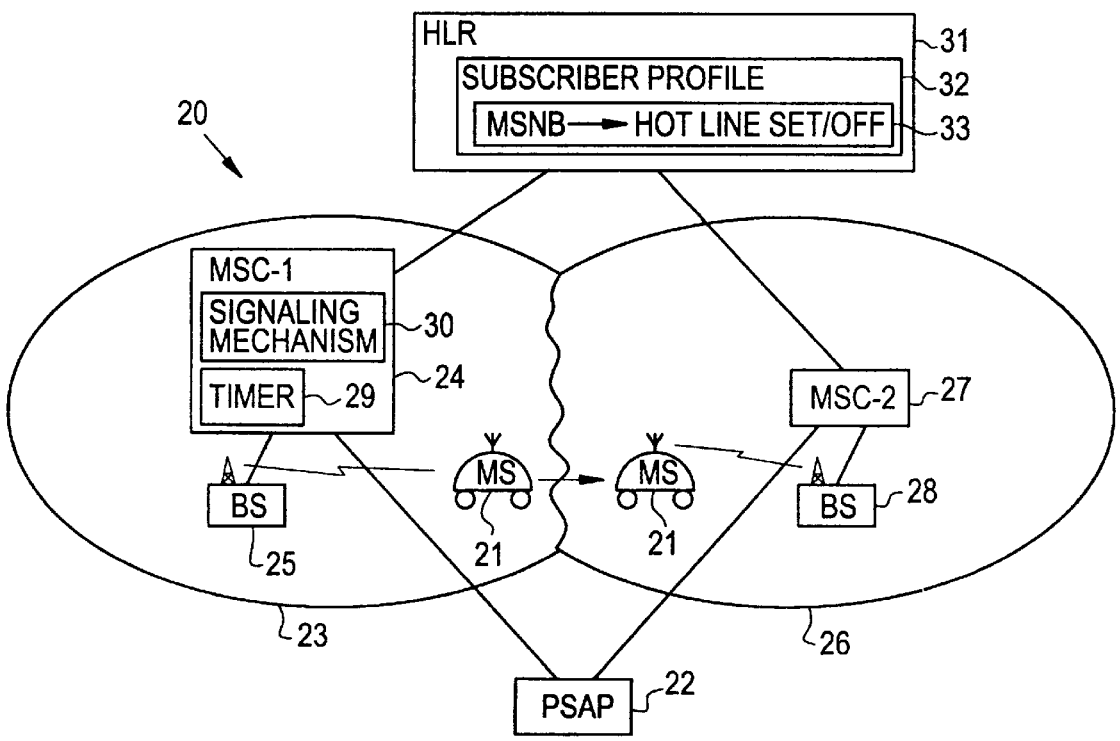
FIG. 2 is a simplified block diagram of a radio telecommunications network in which the system of the present invention has been implemented.

FIG. 2 is a simplified block diagram of a radio telecommunications network 20 in which the system of the present invention has been implemented. An emergency MS 21 is shown to be operating in the service area 23 of a serving MSC 24 and BS 25. The serving MSC is connected to a PSAP 22. The service area 23 is bordered by service area 26 of a bordering MSC 27 and BS 28. The serving MSC includes a reconnection timer 29 and a signaling mechanism 30, the functions of which are described below. Each of the MSCs is connected to a home location register (HLR) 31 which contains a subscriber profile 32 for the emergency MS 21. A new subscriber category (Hot Line) 33 is added to the subscriber profile. The function of the Hot Line category is described below.

Figure 3:
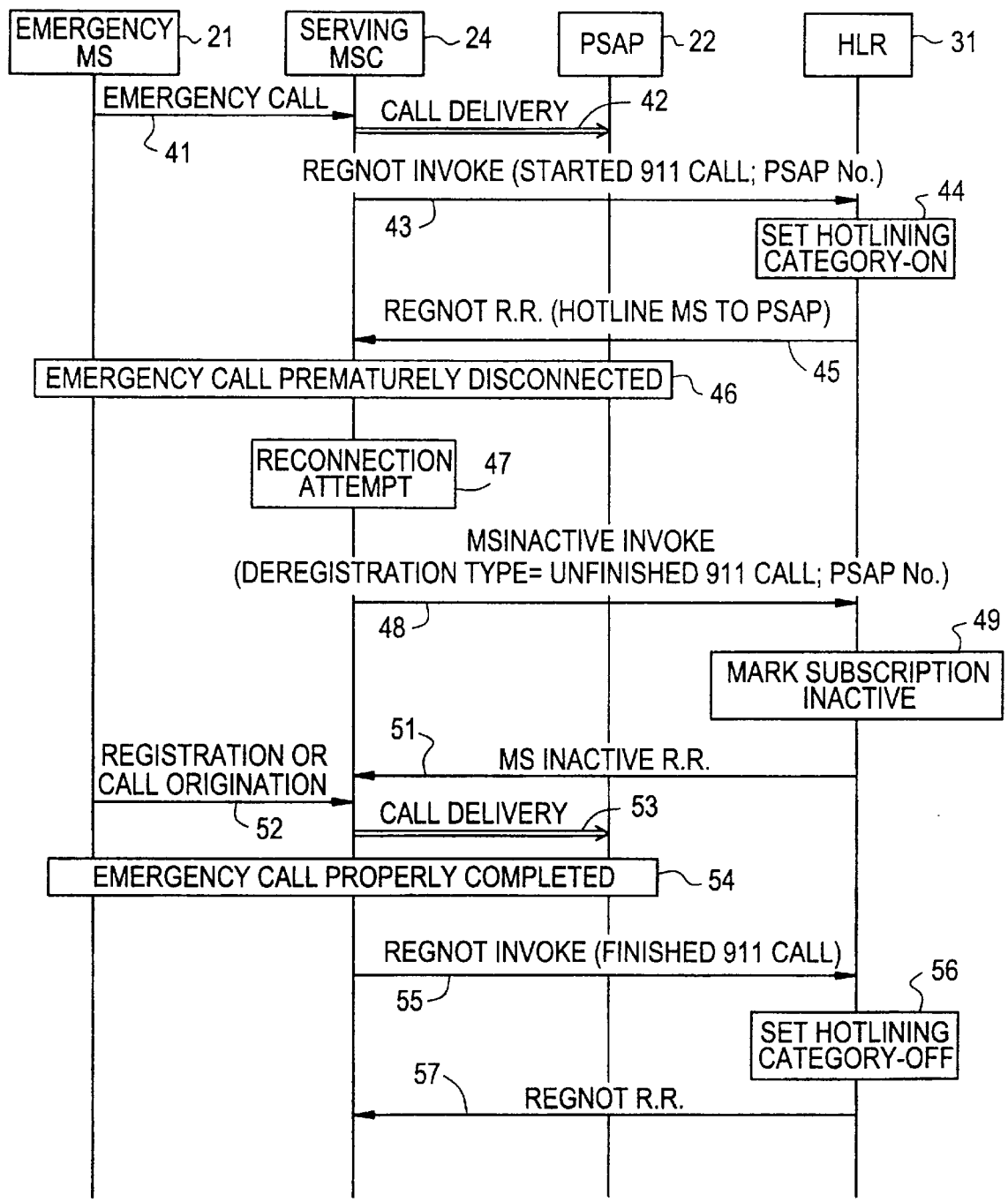
FIG. 3 is a message flow diagram of the messages utilized to set up a hotline between the emergency MS and the PSAP when the emergency MS originates another call before the emergency call can be reconnected.

FIG. 3 is a message flow diagram of the messages utilized to set up a hotline between the emergency MS 21 and the PSAP 22. In this embodiment, the present invention solves the problem associated with the emergency MS immediately originating a call to another destination after the emergency call is disconnected, thereby preventing the original emergency call from being reestablished. In cellular telecommunication networks, when a MS ends a call, the radio connection is released so that the channel can be reallocated. The MS's serving MSC can call him back; however, nothing prevents the MS from immediately originating a call to another destination, thereby preventing the original emergency call from being reestablished.

The method illustrated in FIG. 3 is a "front-end method" in which the hotlining feature is set up at the front end of the emergency call. The emergency MS 21 initiates an emergency call at 41, and the serving MSC 24 delivers the call at step 42 to the PSAP 22. The signaling mechanism 30 implemented in the serving MSC 24 notifies the emergency MS's HLR 31 of the emergency call origination. This may be accomplished by causing the serving MSC to send a Registration Notification (REGNOT) Invoke message 43 to the HLR whenever an emergency call is originated. The REGNOT Invoke message includes a new parameter such as "started 911 call, PSAP ID/PSAP number". Alternatively, the serving MSC may send the parameter in a modified Qualification Request (QUALREQ) Invoke message. The HLR sets the Hot Line category 33 for the emergency MS to ON at 44. The HLR may set up the hotlining feature by allocating the Origination Indicator OI-8 subscriber category (or equivalent overriding category) in the subscriber profile, along with the indication of the unfinished emergency call and the PSAP's directory number. This ensures that upon the next call origination from the emergency MS, the call is automatically re-routed to the proper PSAP. The HLR then returns a REGNOT Return Result message 45 to the serving MSC instructing the MSC to hotline the emergency MS to the PSAP.

Thereafter, if the emergency call is prematurely disconnected for any reason at 46, and the serving MSC cannot reestablish the call at 47, the serving MSC sends a MSInactive Invoke message 48 to the HLR and includes a Deregistration Type parameter set to a new value as "unfinished 911 call". The MSInactive Invoke message may also include the ID number or directory number of the PSAP which was involved in the call. At step 49, the HLR marks the subscription as inactive, and sends a MSInactive Return Result message 51 to the serving MSC. Thereafter, at step 52, the emergency MS may attempt to access the network by re-registering or originating another call. If the emergency MS re-registers, it is paged, and then reconnected to the PSAP at step 53. If the emergency MS originates another call at 52, the serving MSC delivers the call at step 53 to the PSAP.

At step 54, the emergency call is properly completed and disconnected. The serving MSC 24 then sends a REGNOT Invoke message 55 to the HLR reporting the finished 911 call. At step 56, the HLR resets the Hot Line category to OFF, and sends a REGNOT Return Result message 57 to the serving MSC.

The HLR may also be implemented with discrimination logic which enables or disables the hot lining feature if additional registrations are received from cloned MSs before the emergency call is properly completed.

Figure 4:
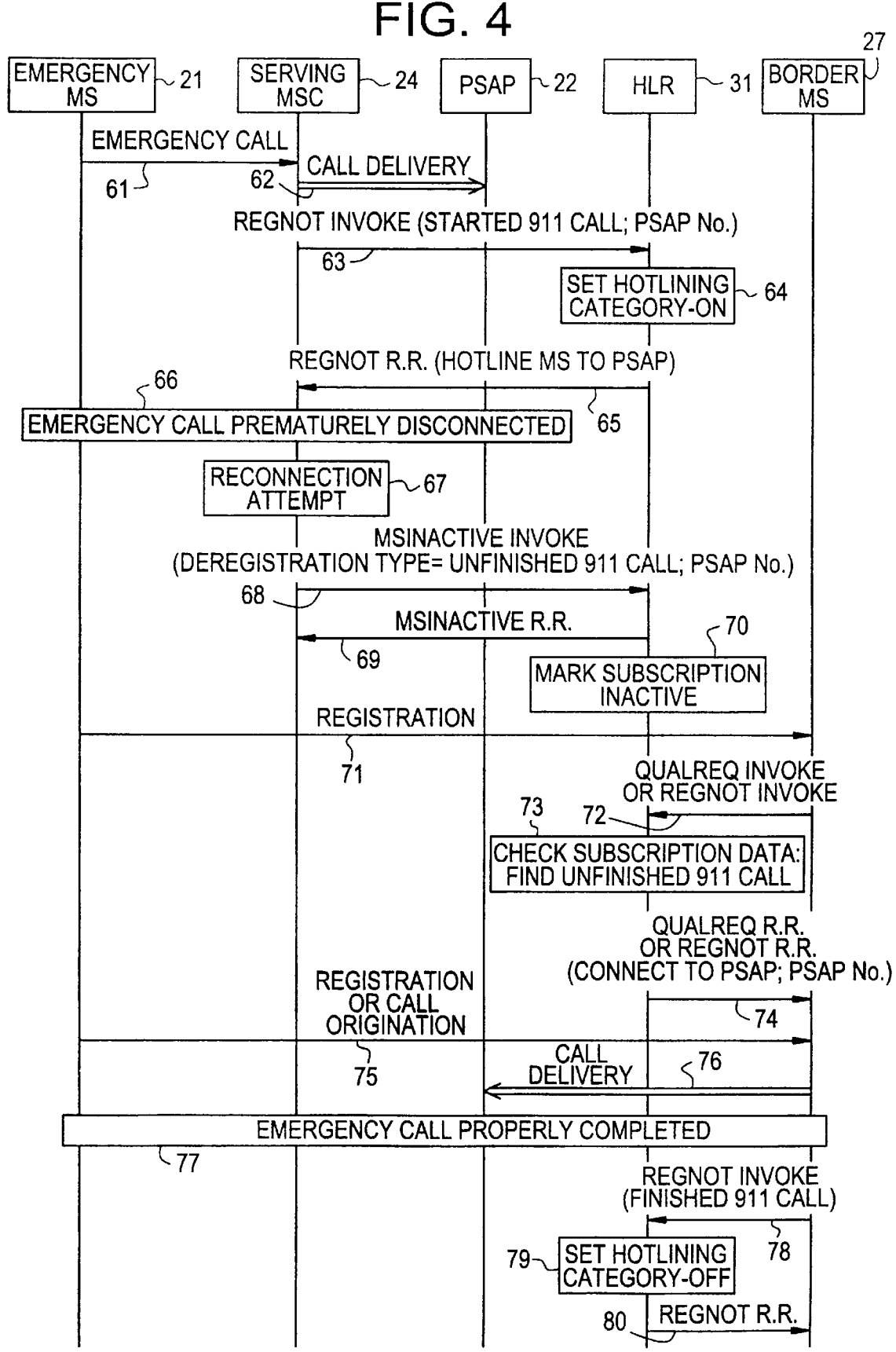
FIG. 4 is a message flow diagram of the messages utilized to set up a hotline between the emergency MS and the PSAP when the emergency MS roams into the service area of a bordering MSC before the emergency call can be reconnected.

FIG. 4 is a message flow diagram of the messages utilized to set up a hotline between the emergency MS 21 and the PSAP 22 when the emergency MS roams into the service area 26 of the bordering MSC 27 before the emergency call can be reconnected. As noted above, when an MS ends a call the radio connection is released so that the channel can be reallocated. The MS's serving MSC can call him back; however, nothing prevents the MS from roaming outside the service area of the serving MSC, thereby preventing the call from being reestablished.

The method illustrated in FIG. 4 is also a "front-end method" in which the hotlining feature is set up at the front end of the emergency call. The emergency MS initiates an emergency call at 61, and the serving MSC 24 delivers the call at step 62 to the PSAP 22. The serving MSC 24 notifies the emergency MS's HLR 31 of the emergency call origination by, for example, sending a REGNOT Invoke message 63 from the serving MSC to the HLR whenever an emergency call is originated. The REGNOT invoke message includes a new parameter such as "started 911 call, PSAP ID/PSAP number". The HLR sets the Hot Line category 33 for the emergency MS to ON at 64 by, for example, allocating the Origination Indicator OI-8 subscriber category. This ensures that upon the next call origination from the emergency MS, the call is automatically re-routed to the proper PSAP. The HLR then returns a REGNOT Return Result message 65 to the serving MSC instructing the MSC to hotline the emergency MS to the PSAP.

Thereafter, if the emergency call is prematurely disconnected for any reason at 66, and the serving MSC cannot reestablish the call at 67, the serving MSC sends a MSInactive Invoke message 68 to the HLR and includes a Deregistration Type parameter set to a new value as "unfinished 911 call". The MSInactive Invoke message may also include the ID number or directory number of the PSAP which was involved in the call. The HLR sends a MSInactive Return Result message 69 to the serving MSC and marks the subscription as inactive at step 70.

At 71, the emergency MS then makes a system access (for example, a periodic registration) with the border MSC 27. The border MSC sends a REGNOT (or QUALREQ) Invoke message 72 to the HLR to obtain subscriber data for the registering MS. The HLR checks the subscription data at 73, and it is found that the MS has been marked as having an unfinished 911 call. Therefore, the HLR sends a REGNOT (or QUALREQ) Return Result message 74 to the border MSC and includes an indication that the MS must be re-connected to the PSAP. The HLR also includes the PSAP directory number provided to the HLR by the serving MSC in either the REGNOT message 63 or the MSInactive message 68. Thereafter, at step 75, the emergency MS may re-register or may originate another call in the border MSC. If the emergency MS re-registers, it is paged, and then reconnected to the PSAP at step 76. If the emergency MS originates another call at 75, the border MSC automatically delivers the call at step 76 to the PSAP.

At step 77, the emergency call is properly completed and disconnected. The border MSC 27 then sends a REGNOT Invoke message 78 to the HLR reporting the finished 911 call. At step 79, the HLR resets the Hot Line category to OFF, and sends a REGNOT Return Result message 80 to the border MSC.

Figure 5:
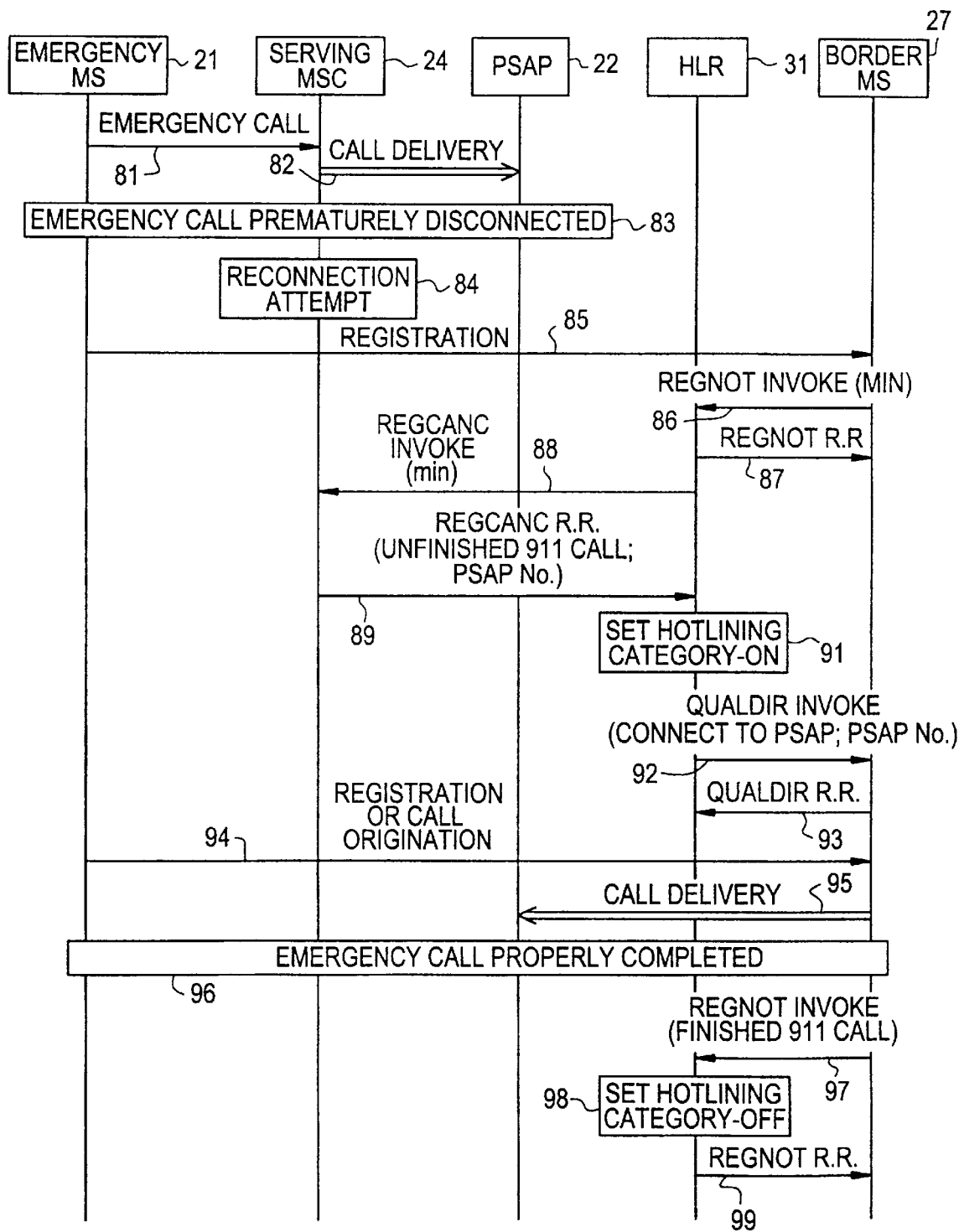
FIG. 5 is a message flow diagram of the messages utilized to set up a hotline between the emergency MS and the PSAP when the emergency MS roams into the service area of the bordering MSC and registers before the emergency call can be reconnected and before the serving MSC has notified the HLR of the unfinished emergency call.

FIG. 5 is a message flow diagram of the messages utilized to set up a hotline between the emergency MS 21 and the PSAP 22 when the emergency MS roams into the service area 26 of the bordering MSC 27 and registers before the emergency call can be reconnected and before the serving MSC has notified the HLR of the unfinished emergency call. The method illustrated in FIG. 5 is a "back-end method" in which the hotlining feature is set up after the emergency call is disconnected because there was no opportunity to set up the feature at the front end of the emergency call. The emergency MS initiates an emergency call at 81, and the serving MSC 24 delivers the call at step 82 to the PSAP 22. At step 83, the emergency call is prematurely disconnected. The serving MSC attempts to reconnect the call at 84, but the attempt fails. Thereafter, the emergency MS registers at 85 in the border MSC 27. When this occurs, the border MSC accepts the registration and sends a REGNOT Invoke message 86 to the HLR to retrieve subscription data for the emergency MS. The HLR returns a REGNOT Return Result message 87 to the border MSC, and sends a Registration Cancellation (REGCANC) Invoke message 88 for the emergency MS to the old serving MSC 24. The old serving MSC then sends a REGCANC Return Result message 89 to the HLR and includes a parameter indicating that the MS is currently involved in an unfinished 911 call along with the PSAP directory number. The HLR sets the Hot Line category to ON at 91, and instructs the new serving (border) MSC 27 to connect the emergency MS to the PSAP in a QUALDIR Invoke message 92. The border MSC responds with a QUALDIR Return Result message 93. Thereafter, at step 94, the emergency MS may re-register or may originate another call in the border MSC. If the emergency MS re-registers, it is paged, and then reconnected to the PSAP at step 95. If the emergency MS originates another call at 94, the border MSC automatically delivers the call at step 95 to the PSAP. Thus, the emergency MS is automatically routed to the PSAP whenever it registers or originates a call in the bordering MSC 27.

At step 96, the emergency call is properly completed and disconnected. The border MSC 27 then sends a REGNOT Invoke message 97 to the HLR reporting the finished 911 call. At step 98, the HLR resets the Hot Line category to OFF, and sends a REGNOT Return Result message 99 to the border MSC.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. In a radio telecommunications network having a serving mobile switching center (MSC) serving a mobile station with an emergency (emergency MS), and a home location register (HLR) that stores features and subscription data for the emergency MS, a method of reconnecting an emergency call between the emergency MS and a public safety answering point (PSAP) when the call has been disconnected before the call was finished, said method comprising the steps of:
   activating in the HLR, a hotlining feature for the emergency MS when the emergency call is begun;
   determining that the emergency call was disconnected before the call was finished;
   determining that the emergency MS attempts to access the network after the emergency call was disconnected; and
   automatically connecting the emergency MS to the PSAP.

2. The method of reconnecting an emergency call between an emergency MS and a PSAP of claim 1 wherein the step of activating a hotlining feature includes setting a hotlining category in the HLR to activate the hotlining feature.

3. The method of reconnecting an emergency call between an emergency MS and a PSAP of claim 1 further comprising, after the step of determining that the emergency call was disconnected before the call was finished, the step of attempting by the serving MSC to reconnect the emergency call to the PSAP.

4. The method of reconnecting an emergency call between an emergency MS and a PSAP of claim 1 wherein the step of determining that the emergency MS attempts to access the network includes determining that the emergency MS attempts to originate a subsequent call.

5. The method of reconnecting an emergency call between an emergency MS and a PSAP of claim 4 wherein the step of automatically connecting the emergency MS to the PSAP includes the steps of:
   instructing the serving MSC to automatically connect the emergency MS to the PSAP when the emergency MS accesses the network; and
   automatically connecting the emergency MS to the PSAP when the emergency MS originates a subsequent call in the serving MSC.

6. The method of reconnecting an emergency call between an emergency MS and a PSAP of claim 1 wherein the step of determining that the emergency MS attempts to access the network includes determining that the emergency MS registers with the serving MSC.

7. The method of reconnecting an emergency call between an emergency MS and a PSAP of claim 6 wherein the step of automatically connecting the emergency MS to the PSAP includes the steps of:
   instructing the serving MSC to automatically connect the emergency MS to the PSAP when the emergency MS accesses the network; and
   automatically connecting the emergency MS to the PSAP when the emergency MS registers with the serving MSC.

8. The method of reconnecting an emergency call between an emergency MS and a PSAP of claim 1 wherein the step of determining that the emergency MS attempts to access the network includes determining that the emergency MS registers with a border MSC.

9. The method of reconnecting an emergency call between an emergency MS and a PSAP of claim 8 wherein the step of automatically connecting the emergency MS to the PSAP includes the steps of:

instructing the border MSC to automatically connect the emergency MS to the PSAP when the emergency MS accesses the network; and automatically connecting the emergency MS to the PSAP when the emergency MS originates a subsequent call in the border MSC.

10. The method of reconnecting an emergency call between an emergency MS and a PSAP of claim 8 wherein the step of automatically connecting the emergency MS to the PSAP includes the steps of:

instructing the border MSC to automatically connect the emergency MS to the PSAP when the emergency MS accesses the network; and automatically connecting the emergency MS to the PSAP when the emergency MS registers with the border MSC.

11. The method of reconnecting an emergency call between an emergency MS and a PSAP of claim 1 wherein the step of activating a hotlining feature in the HLR includes the steps of:

sending a message from the serving MSC to the HLR, the message identifying that the emergency MS has an unfinished emergency call, and providing a PSAP number to the HLR; and setting a hotlining category in the HLR to activate the hotlining feature.

12. The method of reconnecting an emergency call between an emergency MS and a PSAP of claim 11 further comprising the steps of:

determining in the PSAP that the emergency call has been properly completed;

sending a message from the PSAP to the HLR identifying that the emergency call has been properly completed; and setting the hotlining category in the HLR to deactivate the hotlining feature.

13. In a radio telecommunications network having a plurality of mobile switching center (MSCs) including a serving MSC, a mobile station with an emergency (emergency MS), and a home location register (HLR) that stores features and subscription data for the emergency MS, a method of reconnecting an emergency call between the emergency MS and a public safety answering point (PSAP) when the call has been disconnected before the call was finished, said method comprising the steps of:

activating in the HLR, a hotlining feature for the emergency MS when the emergency call is begun;

determining that the call was disconnected before the call was finished;

attempting by the serving MSC to reconnect the emergency call;

determining that the emergency MS registered within the service area of a second MSC other than the serving MSC;

sending from the HLR to the serving MSC, a registration cancellation (REGCANC) message identifying the emergency MS;

sending a return REGCANC message from the serving MSC to the HLR identifying that the emergency MS has an unfinished emergency call and providing a PSAP number to the HLR;

sending an instruction from the HLR to the second MSC instructing the second MSC to automatically connect the emergency MS to the PSAP if the emergency MS attempts to access the network in the second MSC;

determining that the emergency MS attempts to access the network in the second MSC; and automatically connecting the call from the emergency MS to the PSAP.

14. In a radio telecommunications network having a serving mobile switching center (MSC) serving a mobile station with an emergency (emergency MS), and a home location register (HLR) that stores features and subscription data for the emergency MS, a system for reconnecting an emergency call between the emergency MS and a public safety answering point (PSAP) when the call has been disconnected before the call was finished, said system comprising:

means within the HLR for activating a hotlining feature for the emergency MS when the emergency call is begun;

means within the serving MSC for determining that the emergency call was disconnected before the call was finished;

means within the serving MSC for determining that the emergency MS attempts to access the network after the emergency call was disconnected; and means within the serving MSC for automatically connecting the emergency MS to the PSAP.

15. In a radio telecommunications network having a serving mobile switching center (MSC) serving a mobile station with an emergency (emergency MS), a border MSC bordering the serving MSC, and a home location register (HLR) that stores features and subscription data for the emergency MS, a system for reconnecting an emergency call between the emergency MS and a public safety answering point (PSAP) when the call has been disconnected before the call was finished, said system comprising:

means within the HLR for activating a hotlining feature for the emergency MS when the emergency call is begun;

means within the serving MSC for determining that the emergency call was disconnected before the call was finished;

means for informing the HLR that the emergency call was disconnected before the call was finished;

means wit the border MSC for determining that the emergency MS attempts to access the network in the border MSC after the emergency call was disconnected;

means for instructing the border MSC to automatically connect the emergency MS to the PSAP; and means within the border MSC for automatically connecting the emergency MS to the PSAP.

\* \* \* \* \*

UNITED STATES PATENT AND TRADEMARK OFFICE
CERTIFICATE OF CORRECTION

PATENT NO.    : 6,240,284 B1
DATED         : May 29, 2001
INVENTOR(S)   : Bugnon et al.

It is certified that error appears in the above-identified patent and that said Letters Patent is hereby corrected as shown below:

Column 3,
Line 7, delete "MSC)" and substitute -- (MSC) -- therefor.

Column 8,
Line 56, delete "wit" and substitute -- within -- therefor.

Signed and Sealed this

Thirteenth Day of November, 2001

Attest:

*Attesting Officer*

NICHOLAS P. GODICI
*Acting Director of the United States Patent and Trademark Office*